United States Patent
Hung

(10) Patent No.: US 6,766,462 B2
(45) Date of Patent: Jul. 20, 2004

(54) SYSTEM FOR PLAYING MUSIC CDS ON A COMPUTER IN POWER-SAVING MODE

(75) Inventor: I-Hung Hung, San-Chung (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 307 days.

(21) Appl. No.: 10/002,677

(22) Filed: Oct. 19, 2001

(65) Prior Publication Data

US 2003/0079069 A1 Apr. 24, 2003

(51) Int. Cl.[7] .................................................. G06F 3/00

(52) U.S. Cl. ..................... 713/330; 713/300; 713/321; 713/323; 713/324; 713/340; 710/72; 710/74

(58) Field of Search ............... 710/72–74; 713/320–340

(56) References Cited

U.S. PATENT DOCUMENTS

| | | | | |
|---|---|---|---|---|
| 6,006,285 A | * | 12/1999 | Jacobs et al. | 710/14 |
| 6,006,337 A | * | 12/1999 | Koo | 713/324 |
| 6,088,809 A | * | 7/2000 | Atkinson | 713/324 |
| 6,414,675 B1 | * | 7/2002 | Shen | 345/211 |

* cited by examiner

*Primary Examiner*—Jeffrey Gaffin
*Assistant Examiner*—Mike Nguyen
(74) *Attorney, Agent, or Firm*—Quintero Law Office

(57) ABSTRACT

A computer system with the capability to play music CDs while in power-saving mode without the consumption of power by system elements not used by the music-playing operation. The system comprises a CD-ROM, a real-time clock device, a voice processor, a display device, and a power control device. In power-saving mode, the invention supplies power to only the CD-ROM, the voice processor, any loudspeakers present, and the power control device. The invention conserves system power by allowing users to play music CDs while the system remains in power-saving mode.

8 Claims, 2 Drawing Sheets

SYSTEM FOR PLAYING MUSIC CDS ON A COMPUTER IN POWER-SAVING MODE

BACKGROUND OF THE INVENTION

1. Field of the Invention

The present invention relates to a computer power-saving technology, and more particularly to a computer system with a CD-ROM, which provides dedicated power to play music CDs without power consumption by other elements of the computer system. One purpose is to eliminate power consumption by other elements while playing music CDs. Another purpose is to provide a control method to easily operate the music CD player.

2. Description of the Prior Art

Presently, computer systems carry power-saving functions to solve problems related to power insufficiency or power waste, especially in notebook/mobile PCs.

If the computer system remains idle for a certain period, system power is shut down to conserve resources. Generally, the computer system switches to power-saving mode automatically when idle for a period preset by the user. When the user wishes to resume use of the computer, the system "wakes up", switching to normal mode and supplying power to all elements. Conventionally, if a user wants to play a music CD on the CD-ROM drive, he needs to launch the entire computer system. However, while the CD is playing, other functions or devices in the computer system may not be in demand. Power supplied to the elements at this time may be unnecessary.

The need for conservation of power resources is even more pronounced when considering a battery-based system such as a notebook/mobile PC. Current system technology requires that the entire notebook/mobile PC system be launched despite the user only wanting to play a music CD.

SUMMARY OF THE INVENTION

An object of the present invention is to provide a computer system with the capability to play music CDs while in power-saving mode, and more particularly to the technology's application in a notebook/mobile PC with limited battery power. The computer system launches the CD-ROM drive while in power-saving mode, while other elements in the computer system remain in power-saving mode, thus reducing power consumption.

Another object of the present invention is to provide the capability to play music CDs while the system is in power-saving mode, and, more particularly, on a CD-ROM capable of displaying elapsed time. The CD-ROM plays music CDs in power-saving mode, and returns the system to normal mode when a new track starts, or the user operates the forward or back controls. Upon reverting to normal mode, the system calculates the time elapsed and displays the values onscreen.

In order to achieve the aforementioned object, the present invention provides a computer system comprising: a CD-ROM, a real-time clock device providing a reference time, a voice processor that processes the music data output from CD-ROM, a display device, and a CPU. When in normal mode, a control device reads the upcoming audio track on the music CD and adds a reference time. This value is assimilated by the real-time clock device, which sets a wake-up time with the CPU, and, from within power-saving mode, wakes the CPU and enters normal mode when arriving at the wake up time; and a power control device, providing power to the CD-ROM, the voice processor, the CPU, and the control device when the computer system is in power-saving mode.

Moreover, the present invention provides a method to play music CDs, running the CD-ROM and real-time clock device in the computer system, comprising: getting the number of audio tracks and the upcoming audio track time on the music CD; getting a current time with the real-time clock while playing music CDs; adding the current time and the upcoming audio track time to calculate the wakeup time in the computer system; entering power-saving mode and only supplying the power required to play music CDs, and returning the system to regular mode upon wakeup, displaying the calculated elapsed time.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENT

Figure 1:
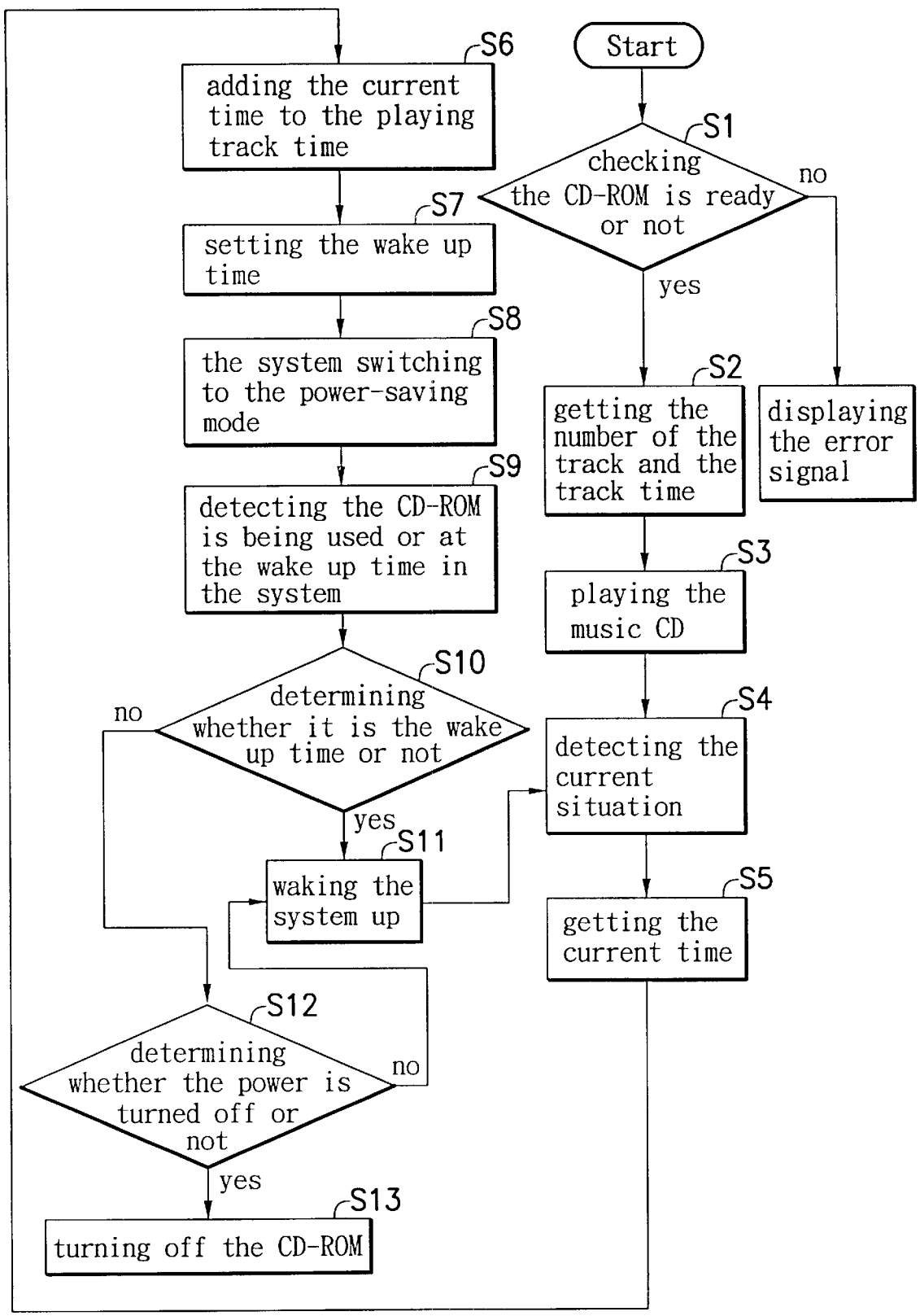
FIG. 1 is a flow chart of the present invention playing music CDs and waking the system up while in power-saving mode.

FIG. 1 is a flow chart showing the process for playing music CDs and waking the system up from power-saving mode according to the present invention. When the CD-ROM is ready, the invention records the number of the audio track and the audio track time (S2) within the computer system, using the music CD (S3). The computer system then assesses the particulars of the music CD and ascertains the current audio tract time, matching the current time (S5) with the real-time clock (RTC). Finally, the current audio track time of the played music is added to the current time (S6) by the CPU, and the result is taken by the system as the wakeup time (S7) for the computer system. The computer system switches to power-saving mode when finished registering the setting (S8).

The computer system wakes up when the CD-ROM controls are operated by the user or at the wakeup time (S9). The system wakes up if the wakeup time is reached (S1), and repeats steps S4 to S8 to prepare its playing of the next audio track. If system power is turned off, the CD-ROM turns off (S13). If the user operates the previous or next track controls, the computer system wakes up (S11), and performs the requested operation. Steps S4 to S8 are then repeated.

Figure 2:
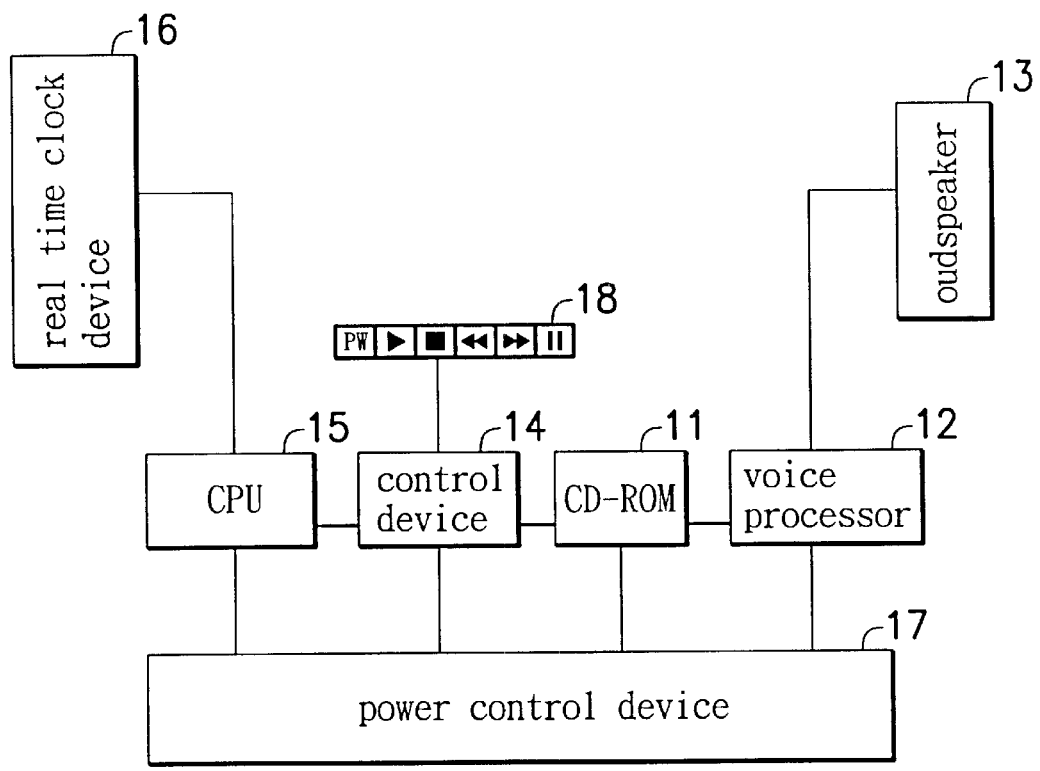
FIG. 2 illustrates a block diagram according to the embodiment of the present invention.

FIG. 2 is a schematic block diagram showing the pertinent elements as employed in the embodiment. The power control device 17 provides necessary power to each element, allowing operation as outlined in this embodiment. The CPU 15 provides power all other operations. In the embodiment, the control device 14, and the keypad 18 provide the means to perform operations as described in the embodiment.

Describing the actions detailed below. First, reading the data in the music CD in the CD-ROM by the computer system, getting the number of tracks and next track time in the music CD by the control device 14 namely. Besides, getting the current time by real-time clock device. Next, adding the next track time to the current time by the CPU, and the result is the next wake up time in the system. Then, the computer system executing to the power saving mode and playing the music in the current audio track, and the power control device 17 supports the power to played the music CD only. The CD-ROM 11 reads the data and outputs to the voice processor 12. The voice processor 12 outputs music data to the loudspeaker 13. When the current time reaches the wake up time in the real-time clock device 16 and wakes the CPU, and then ready to read the next audio track, and repeat the above steps to calculated the wake up time. If it didn't direct by the keypad 18, it repeats and repeats until the end.

When the user operates any of the functions available on the keypad 18, the input is detected by the control device 14, which wakes the CPU. The desired action is performed by the now-awakened CPU and the system returns to power-saving mode.

While the invention has been described by way of example and in terms of the preferred embodiment, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A computer system, comprising:
    a CD-ROM drive for playing music CDs;
    a real-time clock device for providing a reference time;
    a voice processor connected to the CD-ROM for processing music data read by the CD-ROM;
    a CPU;
    a display device;
    a control device for reading upcoming audio tracks in normal mode, then switching the CPU to power-saving mode while the reference time is added to the next audio track time to achieve a wakeup time for the CPU, and waking the CPU and switching to the normal mode at the designated time; and
    a power control device for providing power to the CD-ROM, the voice processor and the control device when the computer system switches to power-saving mode.

2. The computer system as claimed in claim 1, wherein the computer system is a notebook/mobile PC.

3. The computer system as claimed in claim 1, further comprising a loudspeaker for making the music data processed by the voice processor audible to the system's environment.

4. A notebook/mobile PC computer system, comprising:
    a CD-ROM drive for playing music CDs;
    a real-time clock device for providing a reference time;
    a voice processor connected to the CD-ROM for processing music data read by the CD-ROM;
    a CPU;
    a display device;
    a control device for reading upcoming audio tracks in normal mode, then switching the CPU to power-saving mode while the reference time is added to the next audio track time to achieve a wakeup time for the CPU, and waking the CPU and switching to the normal mode at the designated time; and
    a power control device for providing power to the CD-ROM, the voice processor and the control device when the computer system switches to power-saving mode.

5. The notebook/mobile PC computer system as claimed in claim 4, further comprising a loudspeaker for making the music data processed by the voice processor audible to the system's environment.

6. A method for playing music CDs in a computer system with a CD-ROM and a real-time clock device, comprising the following steps:
    reading subsequent track times on the music CD;
    calculating an elapsed time for the computer system by the real-time clock device;
    adding the elapsed time to the subsequent track time to achieve a wakeup time for the computer system;
    switching the system to power-saving mode while supplying power to play the music CD; and
    waking the computer system up at the wake up time.

7. The music CD playing method as claimed in claim 6, wherein the computer system is a notebook/mobile PC computer.

8. The music CD playing method as claimed in claim 6, wherein before the step of getting the next track time in the music CD comprises a step of
    getting the audio track in the music CD.

* * * * *